June 28, 1949.   J. L. HART, JR   2,474,478
AIR CLEANING APPARATUS
Filed Sept. 13, 1945

INVENTOR.
Joseph L. Hart, Jr.
BY

Patented June 28, 1949

2,474,478

UNITED STATES PATENT OFFICE 2,474,478

AIR CLEANING APPARATUS

Joseph L. Hart, Jr., Chickasha, Okla.

Application September 13, 1945, Serial No. 615,976

7 Claims. (Cl. 183—61)

My present invention has for its object to provide an apparatus for removing dust, lint and other impurities from air which is being circulated for the purpose of providing ventilation of certain areas, and which is particularly adapted for certain industrial uses, such as cotton gin stands.

Another object of my invention is to provide a rotating screen or filter which may comprise the inlet of an air ventilating duct and will collect impurities on its exterior with means for continuously driving them off the screen by a recirculation of air passing outwardly through said screen into a collector.

To these and other ends, my invention consists in further improvements and arrangement of parts, all as will be further described in the accompanying specification, the novel features thereof being set forth in the appended claims.

In the drawings.

Similar reference characters in the drawings indicate similar parts.

Figure 1:
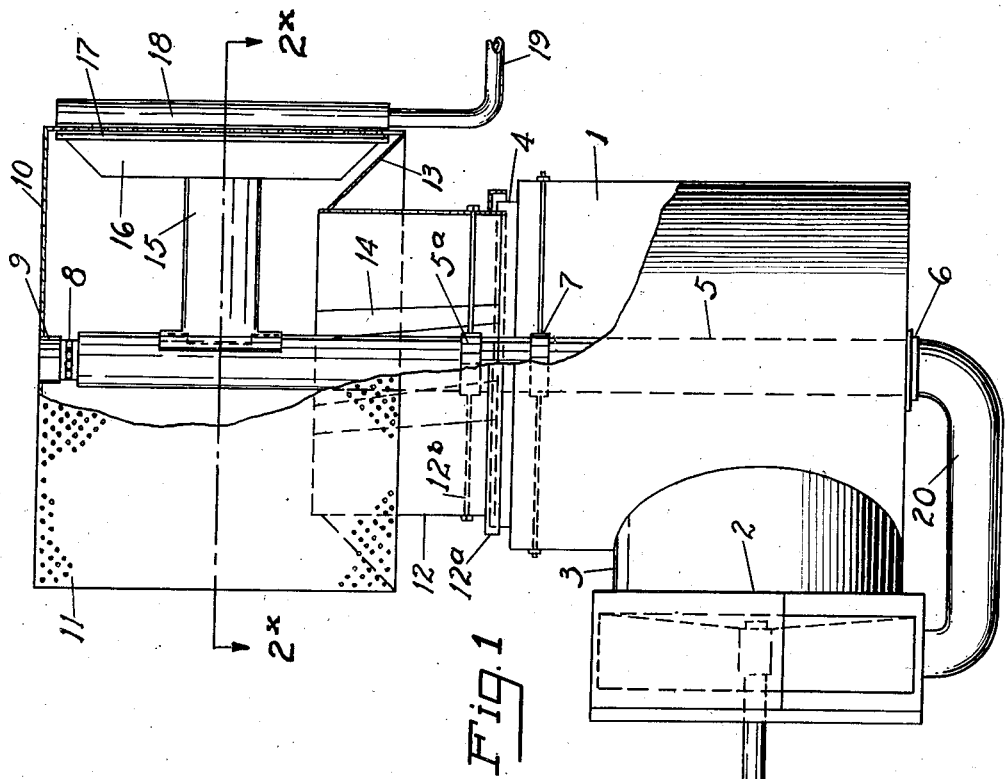
Fig. 1 is a side elevation of an air cleaning apparatus illustrating one embodiment of my invention.
Figure 2:
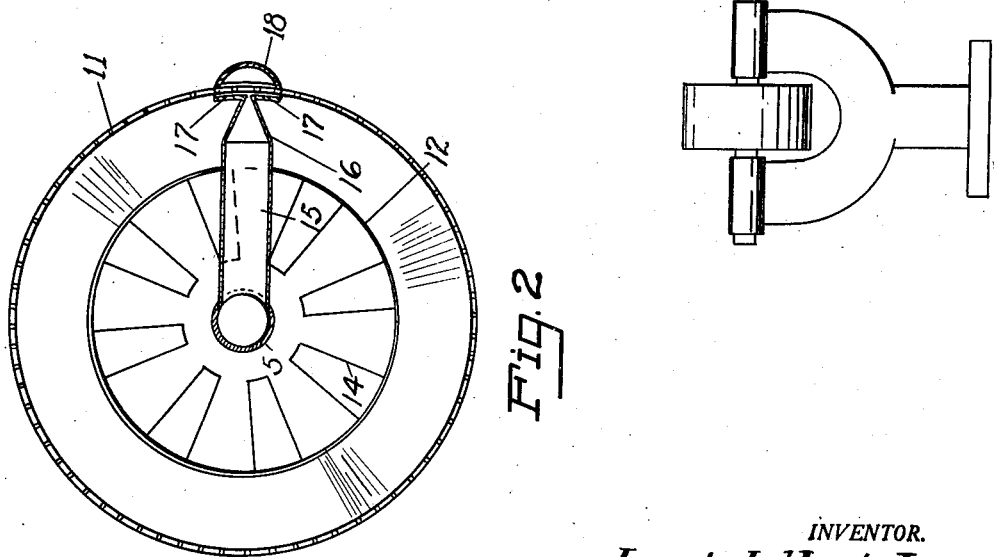
Fig. 2 is horizontal section view taken on the line $2^x$—$2^x$ of Fig. 1.

In order to purify the air circulated in various types of ventilating systems, considerable care is exercised to remove the impurities, either by washing it or passing it through a series of panels containing various forms of filtering substances. In certain types of work these methods are either too expensive, both from the standpoint of the cost of installation and subsequent operation, or the refinements accomplished are more than is actually required for a given installation.

In the illustrations, I have shown a form of filtering device I have successfully used in such places as cotton gins where the air is heavily laden with dust and cotton linters, and from which the output is remarkably free from obnoxious foreign substances.

In constructing the apparatus, I use a suitably shaped, preferably cylindrical, intake chamber 1 which I connect to the intake eye 2 of a rotary fan casing, by means of the pipe collar 3. The top of the casing is defined by a circular rim 4 which is of a slightly reduced diameter. Extending vertically and centrally within the chamber 1 is a pressure circulating air pipe 5 held in place by a collar 6 on the base of the intake and by a spider 7 located near its top, the arms of which radiate to the wall of this chamber to which they are secured.

The pipe 5 extends some distance above the chamber 1 and on its closed top carries one section of a ball race 8. The complimentary part of the latter is on the lower side of a hub 9 which carries a disc 10 and from the periphery of this disc a circular screen 11 depends, the depth and diameter of which is proportional to the outlet opening of the intake chamber.

Suspended within the screen 11 I provide a means for rotating it automatically by the stream of inflowing air. This I accomplish by suspending therein a circular skirt drum 12 which is held in a concentric position by a frustro conical collar 13 secured at its base to the bottom of the screen and fastened at its upper edge to the top of the drum 12. Within the latter are a plurality of angularly disposed blades 14. Inflowing air impinging on these blades causes the screen to rotate. The lower end of the drum 12 fits loosely within the collar 4 of the intake chamber 1, and it also carries an offset flange $12^a$ which surrounds said collar to impede the inflow of any substantial quantity of air at this point. As a means of steadying these freely rotating parts, I provide a central collar $5^a$ which loosely surrounds the pipe 5 and is connected to the bottom portion of the drum 12 by radially extending rods $12^b$.

At a point within the screen, I provide a lateral opening in the pipe 5 and leading therefrom is an air pressure outlet conduit 15 carrying a vertically extending nozzle 16 lying close to the inner side of the screen drum 11. In practice, I form this nozzle with laterally extended lips the edges 17 of which lie close to or may even rub slightly against the inner side of the screen and thus tend to confine the air stream escaping from the nozzle within very close limits.

Extending vertically on the outside of the screen drum opposite the nozzle is a semi-circular box 18 open on the side adjacent the screen which receives the dust and lint particles which have become lodged on the exterior of the screen as they are discharged by the continuous air blast from the nozzle. A duct 19 for conveying this material away leads from the bottom of the box. The air stream supplying the nozzle is obtained by connecting the lower end 20 of the central pipe 5 to the high presure side of the fan casing 2.

In the structure shown and described, it will be seen that I have provided a device which is simple in construction and very effective in operation. The filtering or air screening member may be designed of such a size for a given installation that at any specific point thereon the pressure of the inflowing air will be comparatively low and, by using a restricted nozzle, fed directly from the outlet or pressure side of the fan casing, a high pressure is created over a small area of the screen which acts to clean the screen continuously.

I claim as my invention:

1. In an air cleaning device the connection with an air intake chamber, a pipe extending vertically therefrom and a drum-shaped screen journaled thereon above and opening into said chamber, of an air discharge nozzle fed from said pipe and arranged to discharge air through one side of the screen, means for rotating the screen past the nozzle, and means for circulating air inwardly through the drum and said intake and supplying air under pressure to said pipe.

2. In an air cleaning device the combination with an air circulating fan having a casing forming an inlet suction side and a pressure outlet side, the former extending vertically and open at its top, of a cylindrical screen axially supported above the top of said inlet, of a hollow drum depending from the screen and surrounding said inlet, vanes mounted in the drum, an air nozzle connected to the pressure side of said fan casing extending vertically within and adjacent one side of the screen and a receiver on the exterior of the screen for the material dislodged by the blast from the nozzle.

3. In an air cleaning device the combination with a vertically disposed air intake chamber open at the top, a pipe extending axially above the chamber, and a cylindrical screen journaled on the upper end of the pipe, of a drum carried on the bottom of the screen loosely embracing the open top of the chamber, a nozzle connected to the pipe and extending vertically along the inner face of the screen, a dust conduit opposite the nozzle on the outside of the screen, an air circulating fan connected on its suction side to the intake chamber to draw air through the screen and connected on its pressure side to said pipe.

4. An air cleaning device for use in an air circulating system comprising an air intake chamber, a rotary screen superimposed thereon having an imperforate portion opening into said chamber, vanes carried by said imperforate portion and acted upon by inflowing air to revolve the screen, an air nozzle within the screen connected to said circulating system and arranged to discharge recirculated air from the interior of the screen outwardly through one side thereof.

5. In an air cleaning device the combination with an air blower comprising a casing having an inlet suction side and a pressure outlet side, of a rotary screen provided with an upper perforate section and a lower imperforate section, said imperforate section surrounding the chamber inlet, vanes in the last mentioned section activated by the stream of inflowing air, an air nozzle located within and at one side of the perforated portion of the screen and connected to said pressure outlet for blowing air under pressure therethrough.

6. In an air cleaning device the combination with an air intake chamber having an opening in its top, means for drawing air downwardly therein, and a central support rising therefrom, of a screen drum rotatable on the support and having a collar at its lower end loosely fitting the chamber intake opening, vanes in the collar for rotating the screen under the influence of the air passing inwardly through the screen.

7. In an air cleaning device the combination with an air intake chamber having a circular opening in its top, means for circulating air downwardly therein and a central support rising therefrom, of a screen drum rotatable on the support and of larger diameter than said opening and a circular skirt on the drum embracing said chamber opening, of an air outlet nozzle connected to said air circulating means extending along an area at the inner side of the screen, and fan blades in the air stream within said skirt for rotating the screen.

JOSEPH L. HART, JR.

REFERENCES CITED

The following references are of record in the file of this patent:

UNITED STATES PATENTS

| Number | Name | Date |
|---|---|---|
| 236,437 | Kean | Jan. 11, 1881 |
| 1,002,618 | Winkler | Sept. 5, 1911 |
| 1,649,220 | Goodloe | Nov. 15, 1927 |
| 1,837,836 | Powell | Dec. 22, 1931 |
| 2,282,595 | Will | May 12, 1942 |

FOREIGN PATENTS

| Number | Country | Date |
|---|---|---|
| 148,799 | Great Britain | Oct. 10, 1921 |